(12) United States Patent
Gretz

(10) Patent No.: US 7,009,110 B1
(45) Date of Patent: Mar. 7, 2006

(54) FAN AND FIXTURE MOUNTING ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/208,223

(22) Filed: Aug. 19, 2005

Related U.S. Application Data

(63) Continuation-in-part of application No. 10/816,518, filed on Apr. 1, 2004, now Pat. No. 6,956,170, which is a continuation-in-part of application No. 10/790,973, filed on Mar. 2, 2004, now Pat. No. 6,794,573, which is a continuation-in-part of application No. 10/723,122, filed on Nov. 26, 2003, now Pat. No. 6,777,615, which is a continuation-in-part of application No. 10/464,334, filed on Jun. 18, 2003, now Pat. No. 6,734,356, which is a continuation-in-part of application No. 10/361,292, filed on Feb. 10, 2003, now Pat. No. 6,632,998, which is a continuation-in-part of application No. 10/287,088, filed on Nov. 4, 2002, now Pat. No. 6,646,201, which is a continuation-in-part of application No. 10/012,584, filed on Nov. 7, 2001, now Pat. No. 6,509,524, and a continuation-in-part of application No. 10/017,571, filed on Oct. 22, 2001, now Pat. No. 6,677,523, which is a continuation-in-part of application No. 09/784,981, filed on Feb. 16, 2001, now Pat. No. 6,355,883, and a continuation-in-part of application No. 09/373,431, filed on Aug. 13, 1999, now Pat. No. 6,191,362.

(51) Int. Cl.
*H01H 9/02* (2006.01)

(52) U.S. Cl. ............................ 174/58; 174/60; 174/61; 174/63; 248/342; 220/3.2

(58) Field of Classification Search ................. 174/58, 174/60, 61, 63; 220/3.9, 3.2, 3.3; 248/342, 248/343, 906
See application file for complete search history.

(56) References Cited

U.S. PATENT DOCUMENTS

| | | | |
|---|---|---|---|
| 4,880,128 A * | 11/1989 | Jorgensen ................... 220/3.9 |
| 5,407,088 A * | 4/1995 | Jorgensen et al. ........... 220/3.9 |
| 5,677,512 A * | 10/1997 | Reiker ......................... 174/58 |
| D408,906 S | 4/1999 | Toscano et al. |
| 6,100,469 A | 8/2000 | Jorgensen et al. |
| 6,207,897 B1 | 3/2001 | Reiker |
| 6,881,900 B1 | 4/2005 | Halbert |
| 6,909,045 B1 | 6/2005 | Halbert |
| 6,924,431 B1 * | 8/2005 | Ofcharsky et al. ............ 174/58 |
| 6,930,250 B1 * | 8/2005 | Drane .......................... 174/58 |
| 6,940,016 B1 * | 9/2005 | Cornett et al. ................ 174/58 |

* cited by examiner

*Primary Examiner*—Dhiru R. Patel

(57) ABSTRACT

A prepackaged fan and fixture mounting assembly for securing an electrical fixture, such as a ceiling fan, light fixture, or similar device to an overhead joist or other suitable structure. The mounting assembly includes an electrical box having a closed top, a sidewall, and an open bottom that define an electrical wiring enclosure. Provided within the electrical box are integral holsters for temporary storage of device fasteners. A bracket is provided attached to a recessed area in the sidewall for securing the mounting assembly to an appropriate surface. An electrical fan or fixture is installed to the electrical box by removing the device fasteners from their respective holsters and securing them through the mounting ring of the electrical fixture and into the mounting assembly.

18 Claims, 7 Drawing Sheets

FAN AND FIXTURE MOUNTING ASSEMBLY

This application is a Continuation-In-Part of U.S. patent application Ser. No. 10/816,518 entitled "Prepackaged Mounting Assembly", filed Apr. 1, 2004 now U.S. Pat. No. 6,956,170, which is a Continuation-In-Part of U.S. patent application Ser. No. 10/790,973 entitled "Prepackaged Mounting Assembly", filed Mar. 2, 2004 now U.S. Pat. No. 6,794,573, which is a Continuation-In-Part of U.S. patent application Ser. No. 10/723,122 entitled "Fan Rated Junction Box Assembly", filed Nov. 26, 2003 now U.S. Pat. No. 6,777,615, which is a Continuation-In-Part of U.S. patent application Ser. No. 10/464,334 entitled Prepackaged Mounting Assembly and Bracket Combination, filed Jun. 18, 2003 now U.S. Pat. No. 6,734,356, which is a Continuation-In-Part of 10/361,292 entitled "Prepackaged Mounting Assembly with Holstered Screws", filed Feb. 10, 2003 now U.S. Pat. No. 6,632,998, which is a Continuation-In-Part of U.S. patent application Ser. No. 10/287,088 entitled "Prepackaged Mounting Assembly", filed Nov. 4, 2002 now U.S. Pat. No. 6,646,201, which is a Continuation-In-Part of U.S. patent application Ser. No. 10/012,584 entitled "Prepackaged Mounting Assembly", filed Nov. 7, 2001, now U.S. Pat. No. 6,509,524, and is a Continuation-In-Part of U.S. patent application Ser. No. 10/017,571 entitled "Electrical Fixture Mounting Box and Mounting Assembly", filed Oct. 22, 2001, now U.S. Pat. No. 6,677,523, which is a Continuation-In-Part of U.S. patent application Ser. No. 09/784,981 entitled "Electrical Fixture Mounting Box and Mounting Assembly", filed Feb. 16, 2001, now U.S. Pat. No. 6,355,883, and is a Continuation-In-Part of U.S. patent application Ser. No. 09/373,431 entitled "Electrical Fixture Mounting Box", filed Aug. 13, 1999, now U.S. Pat. No. 6,191,362, of which all of the above are incorporated by reference herein in their entireties.

FIELD OF THE INVENTION

The present invention relates to devices and methods for mounting ceiling fans, lights, and other large and heavy electrical fixtures to ceilings. More particularly, the present invention describes a fan and fixture mounting assembly for providing easy attachment of an electrical fixture to an overhead joist or similar building structure. The fan and fixture assembly comprises an electrical box and a bracket. Fasteners are held in temporary storage locations in the electrical box. The electrical box and bracket are secured to a suitable structural surface. The fasteners are removed from the temporary storage locations and moved to their permanent locations to secure a fan or an electrical fixture to the electrical box. The bracket includes several bends and integral brace members to provide superior stiffness and thereby enable it to support heavy suspended loads.

BACKGROUND OF THE INVENTION

The present invention expands upon the concept of the prepackaged mounting assembly that is disclosed in and shares inventorship with U.S. Pat. Nos. 6,191,362, 6,355,883, 6,509,524, 6,632,998, 6,646,201, 6,677,523, 6,734,356, 6,777,615, and 6,794,573, all of which are incorporated herein by reference.

The prepackaged mounting assemblies disclosed in these patents provide all the hardware needed for attaching a mounting assembly to an overhead beam, including all required fasteners to complete the installation, without the need for an outer wrap or separate packaging to hold the separate components.

In particular, U.S. Pat. No. 6,734,356 provided a prepackaged mounting assembly for securing an electrical fixture, such as a ceiling fan, light fixture, or similar device to an overhead joist or other suitable structure. The mounting assembly included an electrical box having a closed top, a sidewall, and an open bottom that defined an electrical wiring enclosure. Provided within the junction box were integral holsters for temporary storage of threaded fasteners. A bracket was provided attached to the closed top for securing the junction box to a surface. An electrical fan or fixture is then installed to the junction box by removing the threaded fasteners from their respective holsters and securing them through the top of the electrical fixture and into the bracket.

Although U.S. Pat. No. 6,734,356 provided an assembly for securing an electrical fan or fixture to an overhead surface, it has been found that a more secure fan and fixture mounting assembly can be achieved by increasing the stiffness of the bracket and increasing the amount of contact surfaces between the bracket and the electrical box. Accordingly, the present invention improves upon the prepackaged mounting assembly by making it more capable of supporting heavy loads.

OBJECTS AND ADVANTAGES

The mounting assembly of the present invention will therefore provide a mounting assembly having all the required hardware for securing an electrical fixture to the side of an overhead support.

An advantage of the present invention is that all required mounting fasteners are included with the mounting assembly.

A further advantage is that the mounting assembly provides a means of holding the fasteners very securely until needed at the job site, so that there will be no loss or displacement of fasteners during storage or shipment.

An additional advantage is that the fasteners are held in the mounting assembly in a manner that the ends of the fasteners are protected during storage and shipment.

The present invention therefore provides a mounting assembly that does not require separate packaging enclosing it or enclosing fasteners provided separately with the assembly.

The present invention will furthermore provide a mounting assembly including an electrical box and bracket arrangement having improved stiffness and load bearing capacity over prior art fan and fixture mounting assemblies.

These, and other advantages will be apparent to a person skilled in the art by reading the attached description along with reference to the attached drawings.

SUMMARY OF THE INVENTION

According to the present invention, there is provided a prepackaged fan and fixture mounting assembly for securing an electrical fixture, such as a ceiling fan, light fixture, or similar device to an overhead joist or other suitable structure. The mounting assembly includes an electrical box having a closed top, a sidewall, and an open bottom that define an electrical wiring enclosure. Provided within the electrical box are integral holsters for temporary storage of device fasteners. A bracket is provided attached to a recessed area in the sidewall for securing the mounting assembly to an appropriate surface. An electrical fan or fixture is then installed to the electrical box by removing the device fasteners from their respective holsters and securing them through the mounting ring of the electrical fixture and into the mounting assembly.

DESCRIPTION OF THE DRAWINGS

FIG. 10 is a view of the bottom of the fan and fixture mounting assembly and an overhead joist it will be mounted to.

TABLE OF NOMENCLATURE

Figure 1:
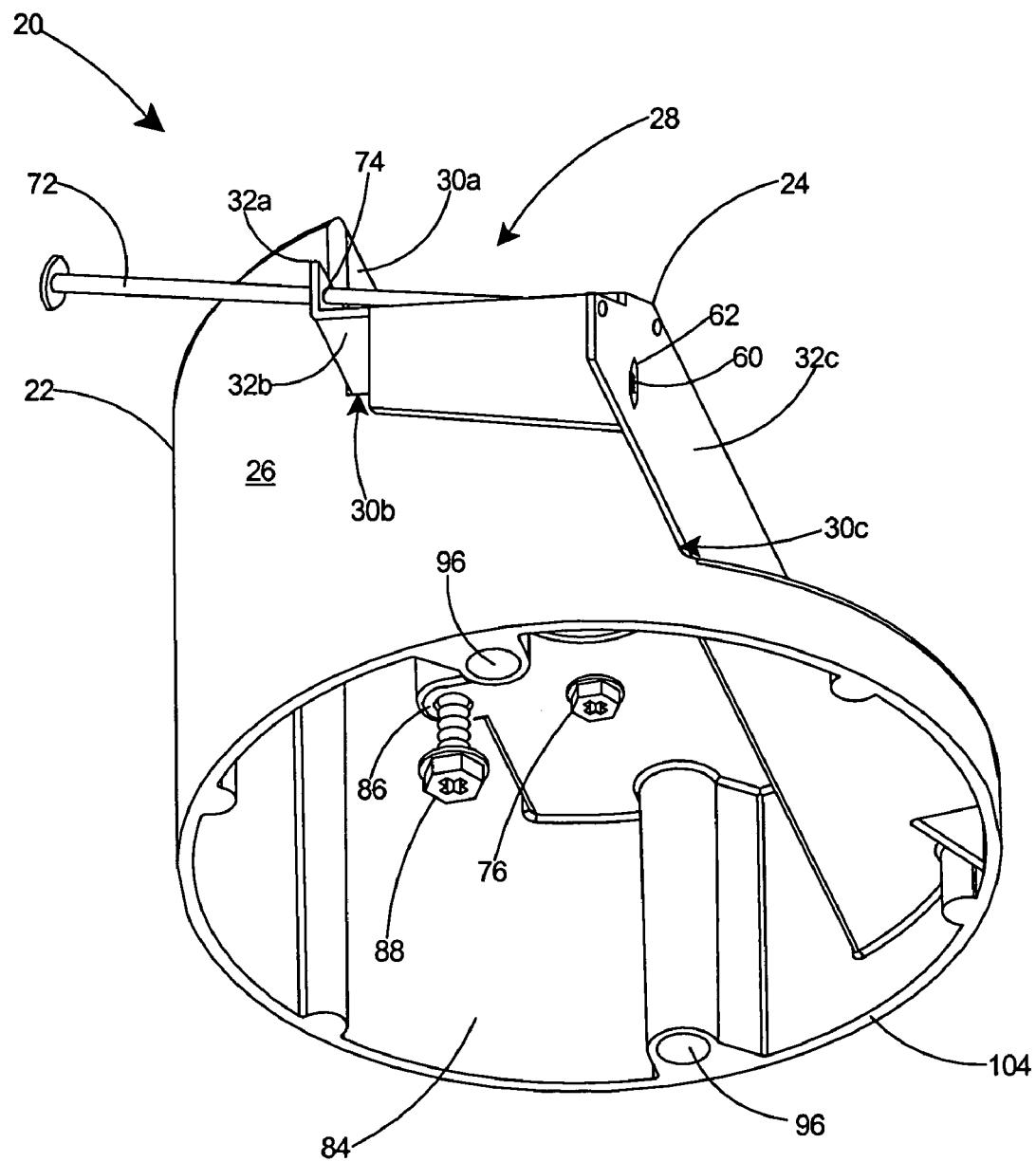
FIG. 1 is a perspective view of a preferred embodiment of a fan and fixture mounting assembly according to the present invention.

The following is a listing of part numbers used in the drawings along with a brief description:

| Part Number | Description |
| --- | --- |
| 20 | fan and fixture mounting assembly |
| 22 | electrical box |
| 24 | bracket |
| 26 | sidewall |
| 27 | closed top |
| 28 | recessed area |
| 30a | first surface |
| 30b | second surface |
| 30c | third surface |
| 32a | first portion |
| 32b | second portion |
| 32c | third portion |
| 34 | outer surface |
| 36 | inner surface |
| 38 | first juncture |
| 40 | second juncture |
| 42 | first end of second portion |
| 44 | second end of second portion |
| 46 | brace member |
| 48 | outer surface of brace member |
| 50 | blank |
| 52 | bend line between first and second portion |
| 54 | bend line between second and third portion |
| 56 | bend line for brace member |
| 58 | forward edge of brace member |
| 60 | tab |
| 62 | opening |
| 64 | crimped area |
| 66 | opening |
| 68 | first depression |
| 70 | second depression |
| 72 | box mounting fastener |
| 74 | aperture |

-continued

| Part Number | Description |
| --- | --- |
| 76 | fastener |
| 78 | end portion of third portion of bracket |
| 80 | aperture |
| 82 | inner wall |
| 84 | inner cavity |
| 86 | bore or holster |
| 88 | device fastener |
| 90 | integral extension |
| 92 | open bore in integral extension |
| 93 | joist |
| 94 | threaded bore in second portion of bracket |
| 96 | permanent receptacle for device fastener |
| 98 | opening in second surface of electrical box |
| 100 | opening in second portion of bracket |
| 102 | snap engagement fitting |
| 104 | lower edge of sidewall |
| $\theta_1$ | angle between the first and second portions of the bracket |
| $\theta_2$ | angle between the second and third portions of the bracket |
| $\theta_3$ | angle of brace member from the portions of the bracket |

DETAILED DESCRIPTION

With reference to FIG. 1, the preferred embodiment of the fan and fixture mounting assembly 20 is used to secure an electrical fixture (not shown), such as a ceiling fan or a light, to an overhead joist, rafter, wall, or other structural surface. The mounting assembly 20 includes an electrical box 22 and a bracket 24.

Figure 4:
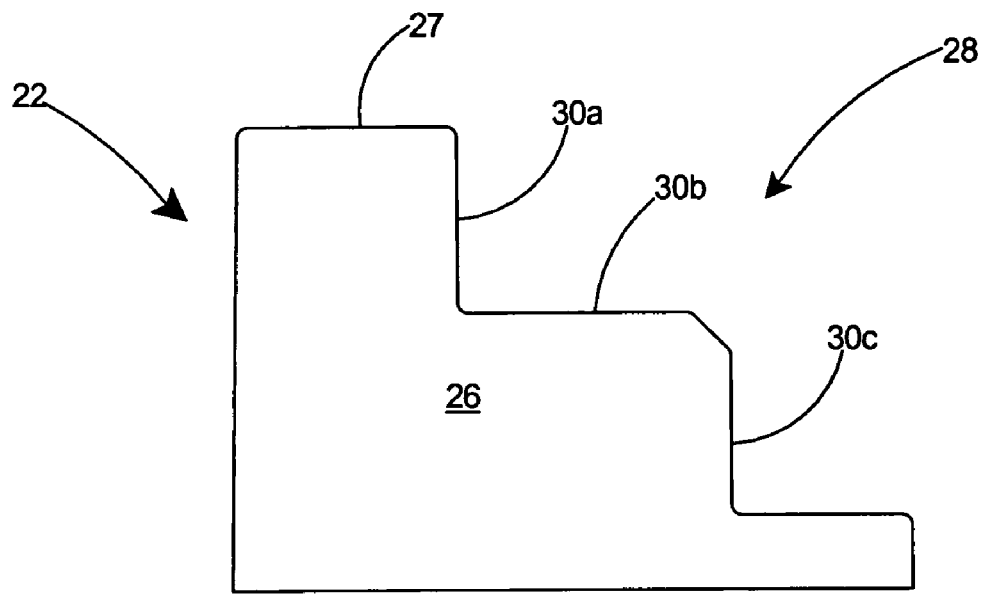
FIG. 4 is a side view of the electrical box taken along line 4—4 of FIG. 3.
Figure 5:
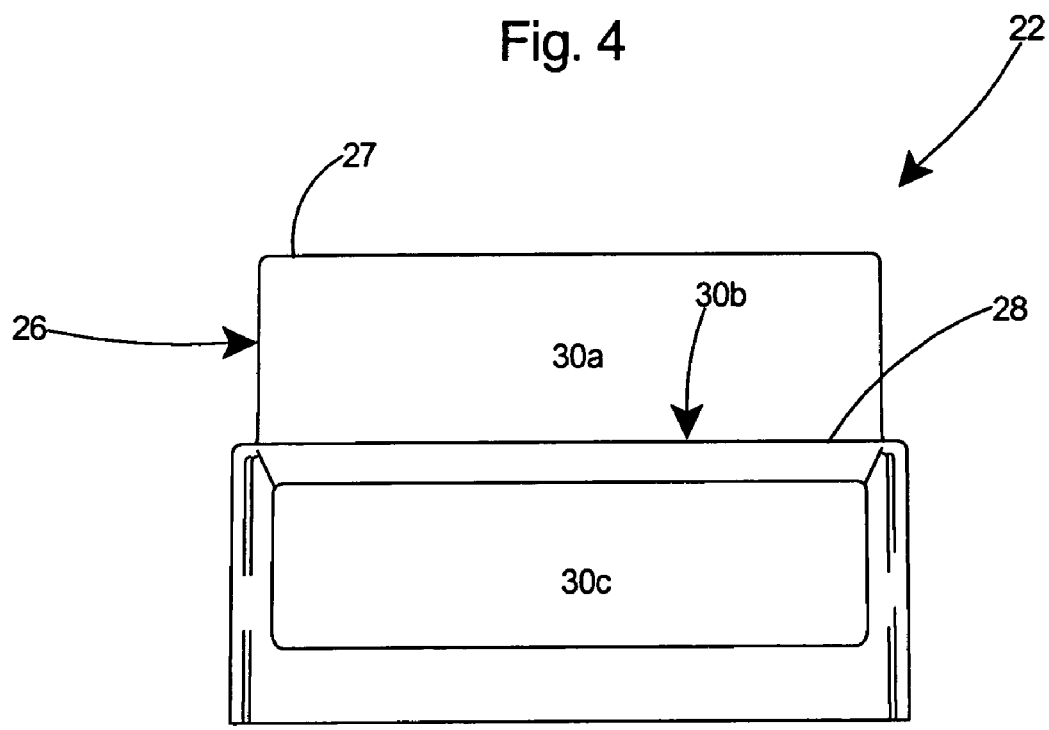
FIG. 5 is a side view of the electrical box taken along line 5—5 of FIG. 3.

As shown in FIGS. 4 and 5, the electrical box 22 includes a sidewall 26, a closed top 27, a recessed area 28 in the sidewall 26 and a plurality of surfaces 30a, 30b, and 30c thereon.

Referring to FIG. 1, the bracket 24 of the fan and fixture mounting assembly 20 includes portions 32a, 32b, and 32c flush with several of the surfaces 30a, 30b, and 30c in the recessed area 28 of the sidewall 26. The bracket 24 is secured to at least one of the surfaces 30b of the electrical box 22.

Referring to FIG. 4, the plurality of surfaces of the recessed area includes a first surface 30a, a second surface 30b, and a third surface 30c.

Figure 8:
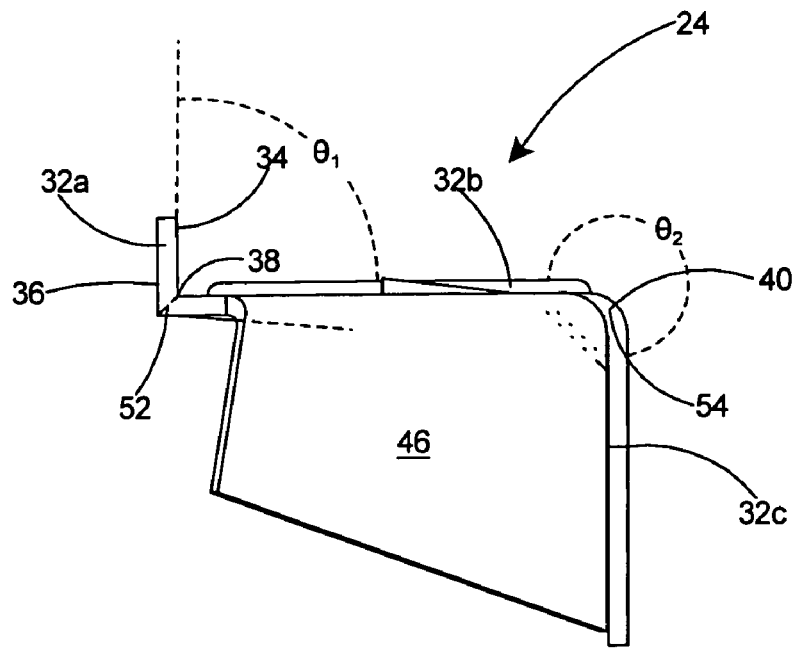
FIG. 8 is an end view of the bracket of FIG. 6.

With reference to FIG. 8, the bracket 24 includes a first portion 32a, a second portion 32b, and a third portion 32c. Each of the three bracket portions 32a, 32b, and 32c include an outer surface 34 and an inner surface 36. The bracket 24 includes a first juncture 38 between the first portion 32a and the second portion 32b and a second juncture 40 between the second portion 32b and the third portion 32c. The first juncture 38 includes a 90 degree angle $\theta_1$ between the outer surface of the first portion 32a and the outer surface of the second portion 32b. The second juncture 40 includes a 270 degree angle $\theta_2$ between the outer surface of the second portion 32b and the outer surface of the third portion 32c.

Figure 8A:
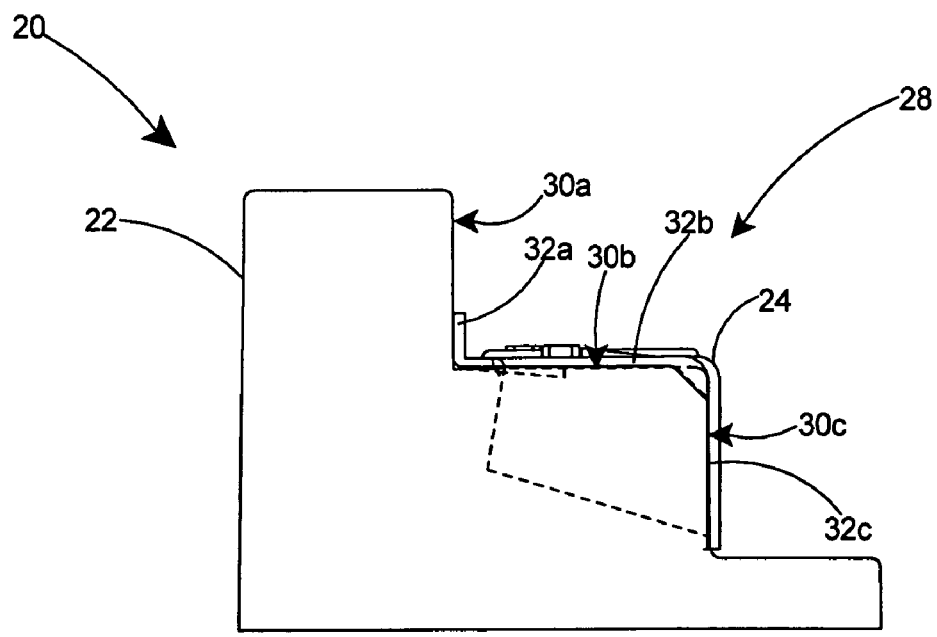
FIG. 8A is a side view of the fan and fixture mounting assembly of FIG. 1.

When the bracket 24 is secured to the electrical box 22, as shown in FIG. 8A, the bracket 24 includes portions flush with at least three of the surfaces 30a, 30b, and 30c of the recessed area 28 of the electrical box 22. As shown in FIG. 8A, first portion 32a of the bracket 24 is flush with first surface 30a of the electrical box 22, second portion 32b of the bracket 24 is flush with second surface 30b, and third portion 32c of the bracket 24 is flush with third surface 30c.

Figure 6:
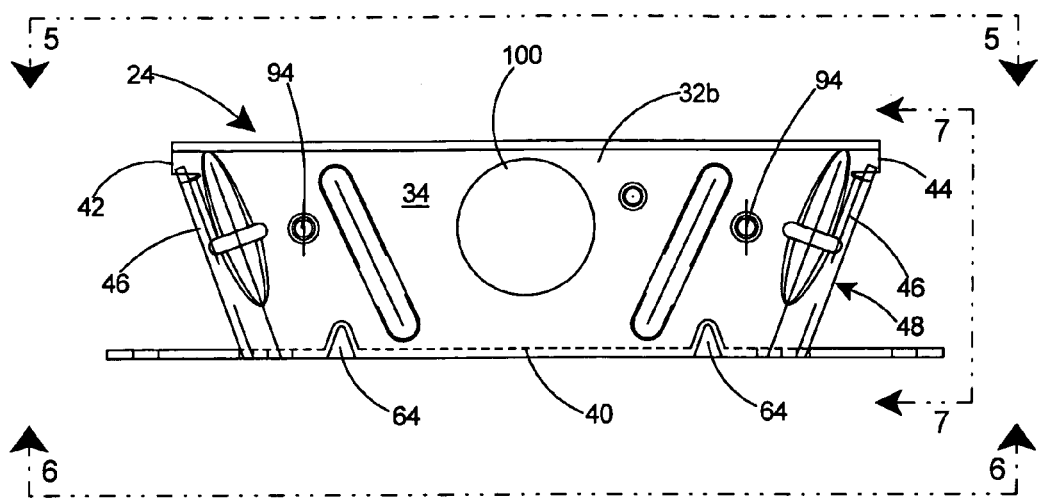
FIG. 6 is a top view of the bracket portion of the fan and fixture mounting assembly of FIG. 1.

Referring to FIG. 6, the second portion 32b of the bracket 24 includes two ends 42 and 44. A brace member 46 is integral with and extends from the ends 42, 44 of the second portion 32b of the bracket 24. The brace members 46 have outer surfaces thereon 48. The brace members 46 are at an angle $\theta_3$ of 270 degrees from the outer surface 34 of the second portion 32b to the outer surface 48 of the brace member 46.

Figure 9:
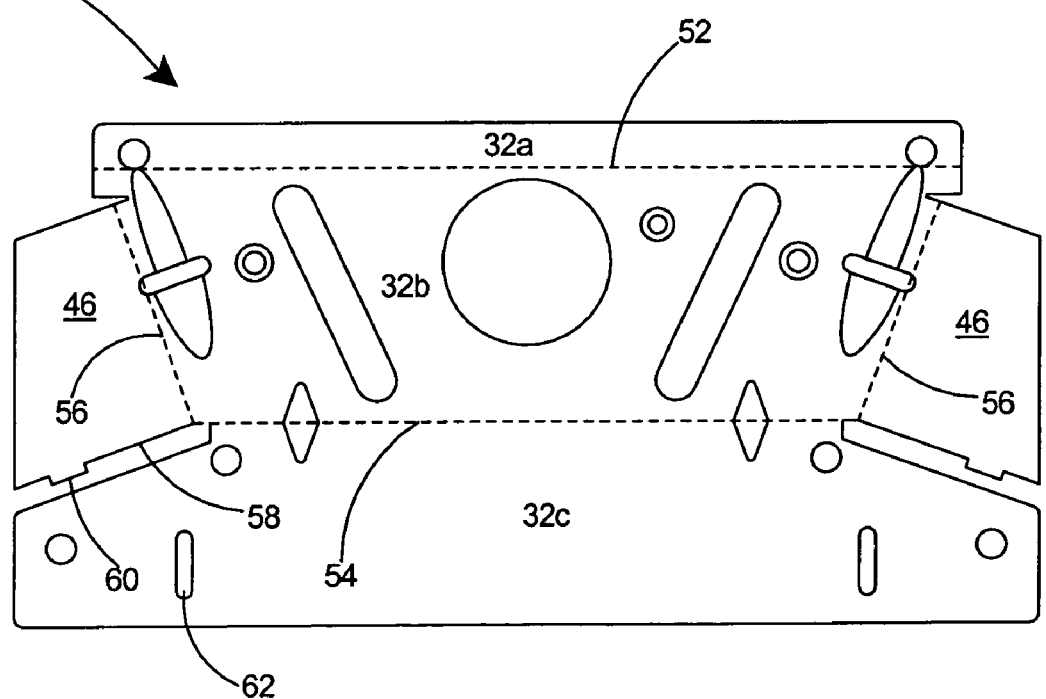
FIG. 9 is a plan view of a blank used to form the bracket portion of the fan and fixture mounting assembly of the present invention.
Figure 7:
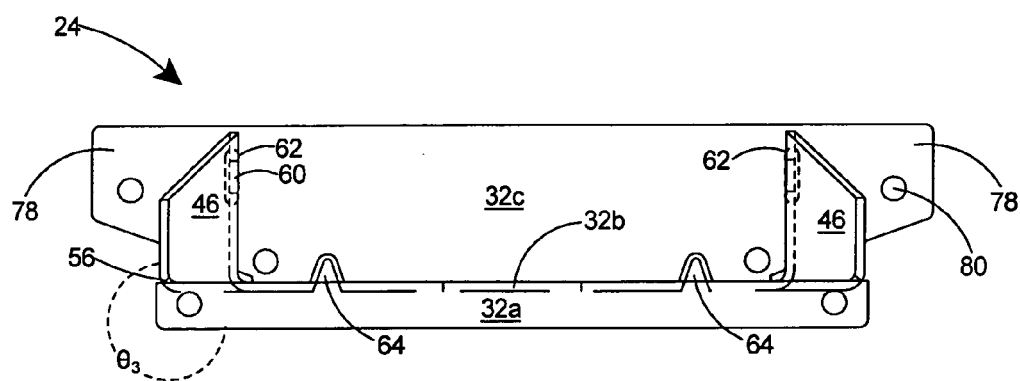
FIG. 7 is side a view of the bracket taken along line 7—7 of FIG. 6.

The bracket 24 of FIGS. 6–8 is typically formed from a flat blank 50 of metal as depicted in FIG. 9. The three major portions 32a, 32b, and 32c of the bracket 24 are shown on the blank 50 prior to it being formed into its eventual shape. Bend lines 52, 54, and 56 are shown in dotted lines in the figure, with bend line 52 between the first 32a and second 32b portions of the blank 50 and bend line 54 between the second 32b and third 32c portions of the blank 50. The brace members 46 will be formed by bending along bend line 56. The brace members 46 include a forward edge 58 and a tab 60 extending from the forward edge 58. Openings 62 are included in the third portion 32c of the blank 50.

To form the bracket from the blank 50 shown in FIG. 9, with the second portion 32b remaining in place, the first portion 32a is bent upward 90 degrees, the brace members 46 are bent downward 90 degrees, and the third portion 32c is bent downward 90 degrees. When the blank 50 is formed into the bracket, the forward edges 58 of the brace members 46 contact the third portion 32c, as shown in FIG. 7, and the tabs 60 extend through the openings 62 in the third portion 32c.

As shown in FIG. 9, the second juncture 40 includes one or more crimped areas 64 therein. The crimped areas 64 increase the stiffness of the bracket.

Figure 10:
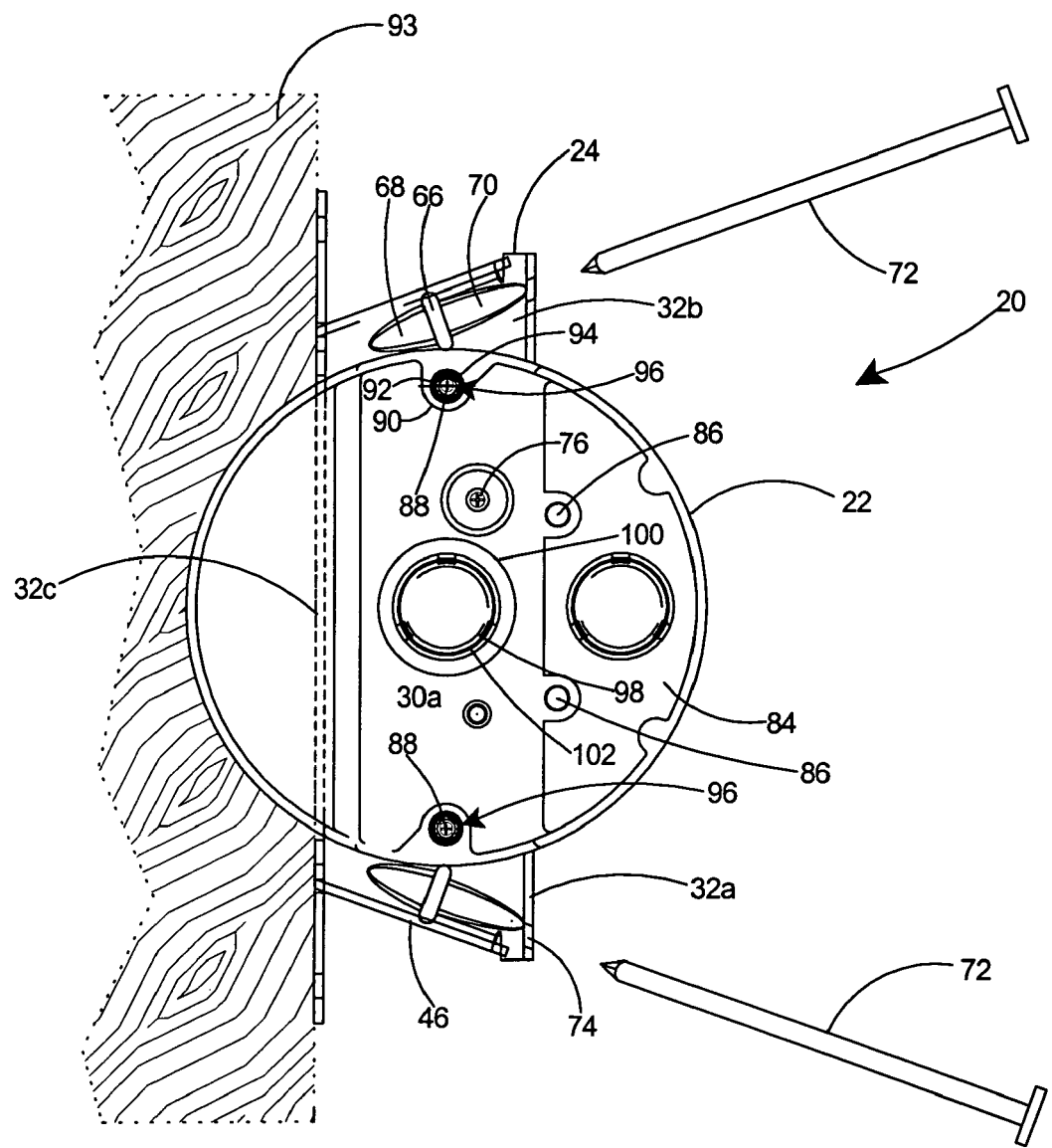

Referring to FIG. 10, the bracket 24 further includes openings 66 in the second portion 32b and two depressions 68 and 70 surrounding the openings 66. One depression 68 is formed toward one side of the planar second portion 32b and the second depression 70 is formed toward the opposite side of the planar second portion 32b. Box mounting fasteners 72, shown exploded from the bracket 24 in FIG. 10, when inserted therein, are held frictionally within the openings 66 as shown in FIG. 1. The first portion 32a of the bracket 24 further includes apertures 74 therein which help in guiding the box mounting fasteners 72 through the bracket 24.

As shown in FIG. 1, the bracket 24 is secured to the electrical box 22 by a fastener 76 secured through the second surface 30b of the electrical box 22 and into the bracket 24.

With reference to FIG. 7, the third portion 32c of the bracket 24 includes end portions 78 extending outwards of the openings 62. The end portions 78 include apertures 80 therein, with the apertures 80 extending substantially beyond the brace members 46 of the second portion 32b of the bracket 24. The apertures 80 offer an alternative location for use in securing the fan and fixture mounting assembly to a surface, as a fastener (not shown) can be inserted therethrough to secure the mounting assembly to the surface.

Figure 3:
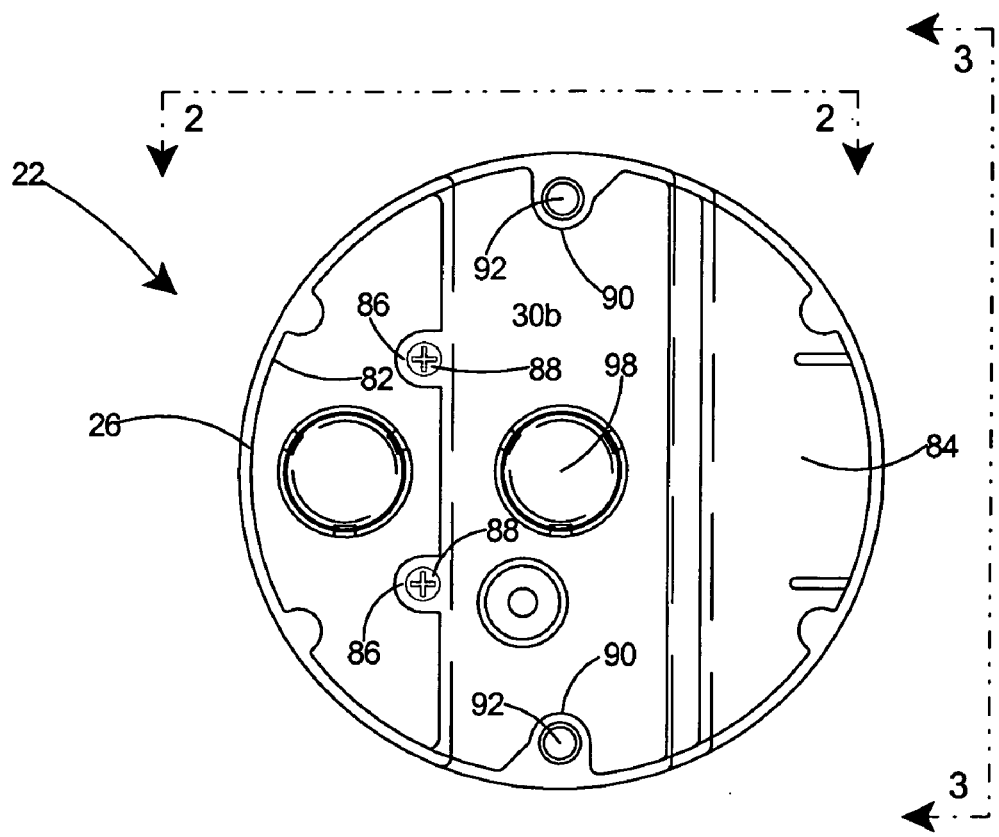
FIG. 3 is a bottom view of the electrical box of FIG. 2.

Referring to FIG. 3, the sidewall 26 of the electrical box 22 includes inner walls 82 and an electrical wiring enclosure or inner cavity 84 therein. The inner walls 82 include bores or holsters 86 therein integral with the inner wall 82 of the electrical box. The fan and fixture mounting assembly 20 includes device fasteners 88 temporarily secured within the holsters 86.

The sidewall 26 further includes a pair of integral extensions 90 from the inner wall 82 with each of the integral extensions preferably 180 degrees apart on the sidewall 26. An open bore 92 is provided within each of the integral extensions 90.

As shown in FIG. 6, threaded bores 94 are provided in the second portion 32b of the bracket 24.

Referring to FIG. 10, the fan and fixture mounting assembly 20 is shown aligned with an overhead joist 93 to which it will be secured by box mounting fasteners 72. The threaded bores 94 in the second portion 32b of the bracket 24 are in axial alignment with the open bores 92 of the extensions 90 thereby forming permanent receptacles 96 (see FIG. 10) for the device fasteners 88. The device fasteners 88, when secured in the permanent receptacles 96, are completely clear of engagement with the integral extensions 90. Since the device fasteners 88 are completely clear of engagement with the integral extensions 90, the load imposed by a fan or fixture hung from the mounting assembly 20 will be supported entirely by the bracket 24. This provides the advantage that the entire load is supported by the bracket 24, which is preferably constructed of metal, and not by the electrical box 22, which may be constructed of plastic.

With reference to FIG. 3, an opening 98 is provided in the second surface 30b of the electrical box 22. The second portion 32b of the bracket 24, as shown in FIG. 6, also includes an opening 100 therein. When the bracket 24 has been secured to the electrical box, as shown in FIG. 10, the opening 98 in the second surface 30b of the electrical box 22 is in axial alignment with the opening 100 in the second portion 32b of the bracket 24. A snap engagement electrical fitting 102 can be snapped into the opening 98 in the electrical box. With the openings 98 and 100 in axial alignment, electrical wiring (not shown) can be routed through the two openings 98 and 100 and into the inner cavity 84 to supply electricity to the mounting assembly 20. The snap engagement fitting 102 will grasp the outer surface of any cable inserted therethrough and provide strain relief on the cable to prevent unwanted removal of the cable from the electrical box 22.

The fan and fixture mounting assembly 20 is provided in one piece, as shown in FIG. 1, with the bracket 24 secured to the electrical box 22 by fastener 76. The mounting assembly 20 also includes device fasteners 88 secured in holsters 86, one of which is in view, and box mounting fasteners 72, one of which is in view in the figure. The fan and fixture mounting assembly 20 is operated by first placing the mounting assembly 20 against a suitable support (not shown) so that the third portion 32c of the bracket 24 is in contact with the support. Box mounting fasteners 72 are then driven into the support to secure the mounting assembly 20 thereto. After the mounting assembly is secured to the support, the device fasteners 88 can be removed from their temporary storage receptacles or holsters 86 and wiring (not shown) fed into the inner cavity 84 and connections completed therein. The mounting ring of the electrical fan or light (not shown) is then raised to the lower edge 104 of the sidewall 26 and aligned thereto. The device fasteners 88 are then passed through the mounting ring of the electrical device and driven into the permanent receptacles 96 to secure the electrical device to the mounting assembly 20.

Figure 2:
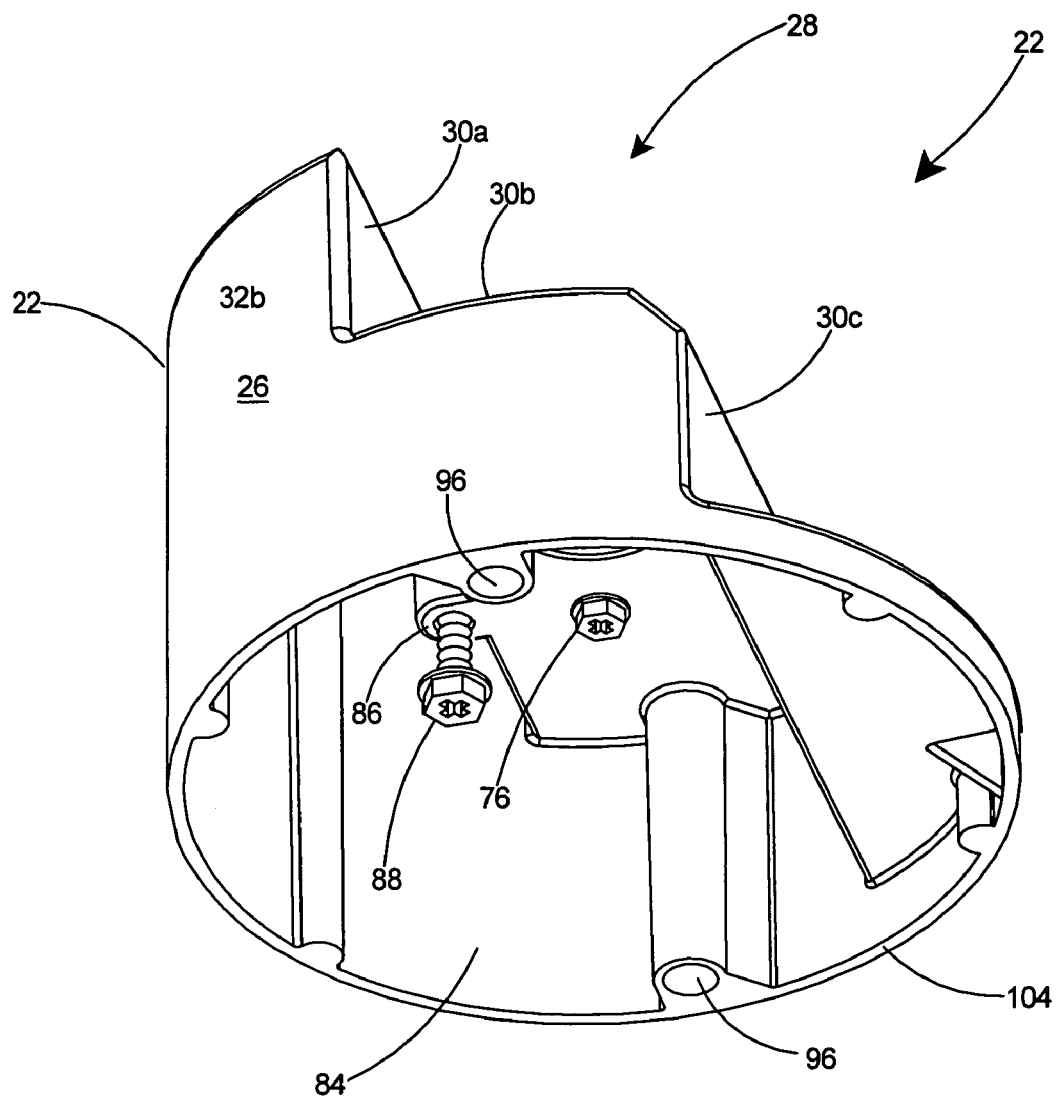
FIG. 2 is a perspective view of an electrical box portion of the fan and fixture mounting assembly of FIG. 1.

With reference to FIG. 2, the electrical box 22 may be molded of plastic in one piece or constructed of metal.

Preferably the bracket 24, shown in FIGS. 6–8, is formed in one-piece from a metal blank 50 such as the one shown in FIG. 9. Preferably the blank is formed of steel.

As shown in FIG. 8, the bracket 24 of the present invention, being constructed from a single piece of metal and having bend angle $\theta_1$ at bend line 52 and bend angle $\theta_2$ at bend line 54, exhibits superior stiffness for resisting bending forces when supporting a heavy electrical device. The stiffness is further improved by brace members 46 providing bracing action between the second portion 32b and third portion 32c of the bracket 24.

With reference to FIG. 7, the bracing action of the brace members 46 are further improved by the brace members 46 being bent at angle θ₃ along bend lines 56 and the tabs 60 locked into the openings 62 in the third portion 32c of the bracket 24. Crimped areas 64 also increase the stiffness of the bracket 24.

As the invention has been described, it will be apparent to those skilled in the art that the same may be varied in many ways without departing from the spirit and scope of the invention. Any and all such modifications are intended to be included within the scope of the appended claims.

What is claimed is:

1. A fan and fixture mounting assembly comprising:
   an electrical box including a sidewall;
   a recessed area in said sidewall of said electrical box;
   a plurality of surfaces on said recessed area;
   a bracket having portions flush with at least three of said surfaces; and
   said bracket secured to at least one of said surfaces.

2. The fan and fixture mounting assembly of claim 1 wherein said plurality of surfaces of said recessed area includes a first surface, a second surface, and a third surface.

3. The fan and fixture mounting assembly of claim 2 wherein said bracket includes a first portion, a second portion, and a third portion;
   an outer surface and an inner surface on each of said portions;
   a first juncture between said first portion and said second portion; and
   a second juncture between said second portion and said third portion.

4. The fan and fixture mounting assembly of claim 3 wherein said first juncture includes a 90 degree angle between said outer surface of said first portion and said outer surface of said second portion; and
   said second juncture includes a 270 degree angle between said outer surface of said second portion and said outer surface of said third portion.

5. The fan and fixture mounting assembly of claim 4 wherein said second juncture includes one or more crimped areas therein.

6. The fan and fixture mounting assembly of claim 3 wherein said second portion of said bracket includes two ends;
   brace members integral with said ends of said second portion of said bracket; and
   said brace members having an outer surface; and
   said brace members at a 270 degree angle from said outer surface of said second portion to said outer surface of said brace members.

7. The fan and fixture mounting assembly of claim 6 wherein said third portion of said bracket includes openings therein;
   said brace members include a forward edge thereon;
   said forward edges of said brace members include tabs extending therefrom;
   said forward edges of said brace members contact said third portion of said bracket; and
   said tabs extend through said openings in said third portion of said bracket.

8. The fan and fixture mounting assembly of claim 7 wherein
   said third portion of said bracket includes end portions extending outwards of said openings in said third portion of said bracket;
   apertures in said end portions; and
   said apertures extend substantially beyond said brace members of said second portion of said bracket.

9. The fan and fixture mounting assembly of claim 6 wherein
   said sidewall on said electrical box includes an inner cavity and inner walls therein;
   said inner walls include bores therein integral with said electrical box; and
   device fasteners temporarily secured within said bores.

10. The fan and fixture mounting assembly of claim 6 wherein said second surface of said recessed area includes an opening therein;
    said second portion of said bracket includes an opening therein;
    said opening in said second surface of said recessed area is in axial alignment with said opening in said second portion of said bracket; and
    said opening in said second surface of said recessed area includes a snap engagement electrical fitting therein.

11. The fan and fixture mounting assembly of claim 3 including
    openings in said second portion of said bracket; and
    box mounting fasteners frictionally held in said openings.

12. The fan and fixture mounting assembly of claim 11 wherein
    said first portion of said bracket includes apertures therein; and
    said box mounting fasteners extend through said apertures in said first portion of said bracket.

13. The fan and fixture mounting assembly of claim 2 wherein said bracket is secured to said electrical box by a fastener secured through said second surface of said recessed area and into said bracket.

14. The fan and fixture mounting assembly of claim 2 wherein said bracket is constructed of metal.

15. The fan and fixture mounting assembly of claim 1 wherein
    said sidewall of said electrical box includes an inner surface;
    a pair of integral extensions from said inner surface of said sidewall with each of said integral extensions being 180 degrees apart on said sidewall;
    an open bore within each of said extensions;
    threaded bores in said second portion of said bracket; and
    said threaded bores in said second portion of said bracket in axial alignment with said open bores of said extensions thereby forming permanent receptacles for said device fasteners,
    whereby said device fasteners when secured in said permanent receptacles are completely clear of engagement with said extensions of said sidewall of said electrical box.

16. The fan and fixture mounting assembly of claim 1 wherein said electrical box is molded of plastic in one piece.

17. The fan and fixture mounting assembly of claim 1 wherein said electrical box is constructed of metal.

18. The fan and fixture mounting assembly of claim 1 wherein said bracket is formed in one-piece.

* * * * *